United States Patent [19]

Saijyo et al.

[11] Patent Number: 5,604,898

[45] Date of Patent: Feb. 18, 1997

[54] DATABASE ENQUIRY SYSTEM

[75] Inventors: Masaru Saijyo; Kuninaga Takeda, both of Tokyo, Japan

[73] Assignee: NEC Corporation, Tokyo, Japan

[21] Appl. No.: 57,787

[22] Filed: May 6, 1993

[30] Foreign Application Priority Data

May 7, 1992 [JP] Japan .................................. 4-114998

[51] Int. Cl.⁶ .................................................. G06F 17/30
[52] U.S. Cl. .......................................................... 395/604
[58] Field of Search .................................. 395/600, 148, 395/161, 153; 364/419

[56] References Cited

U.S. PATENT DOCUMENTS

| | | | |
|---|---|---|---|
| 5,185,857 | 2/1993 | Rozmanith et al. | 395/148 |
| 5,297,039 | 3/1994 | Kanaegami et al. | 364/419 |
| 5,303,367 | 4/1994 | Leenstra, Sr. et al. | 395/600 |
| 5,339,392 | 8/1994 | Risberg et al. | 395/161 |
| 5,388,196 | 2/1995 | Pajak et al. | 395/153 |

OTHER PUBLICATIONS

Dionysios C. Tsichritzis & Frederick H. Lochovsky, "Data Base Management Systems", Academic Press, Inc. 1977.

*Primary Examiner*—Thomas G. Black
*Assistant Examiner*—Cheryl R. Lewis
*Attorney, Agent, or Firm*—Foley & Lardner

[57] ABSTRACT

There is provided a system comprising a network model data memory for storing network model data which stores the condition in which the record of the network type database is stored and an object generating/executing circuit for, upon request for referencing to the record stored within the network type database, referencing to this network model data to make enquiry, to automatically operate an optimum method of retrieving a reference request record of the network type database for determination. Based on this determination, the enquiry object generating/executing circuit combines the objects for inquiring of a plurality of databases for generation. Thus, the control enquiry for the network type database can be executed as if it were executed on the relational type database.

10 Claims, 13 Drawing Sheets

DATABASE ENQUIRY SYSTEM

BACKGROUND OF THE INVENTION

The present invention relates to a system for controlling enquiry of a database for use in a computer system and, in particular, to a system for making an efficient enquiry both of a relational type database and a network type data base built on a network.

The control of the enquiry of the network type database, unlike that of the relational type database, is arranged so that a single enquiry is made by processing a single record and, in order to realize an enquiry of a file which is the entire set of records, as in the enquiry control of the relational type database, it is necessary to combine a plurality of enquiries.

FIGS. 1 and 2 illustrate a conventional relational type database enquiry control system and a conventional system for controlling enquiry of the network-type database, respectively, in which a database enquiry statement which is entered from a terminal unit 1 or application program 2 is analyzed for its content by a relational type database control portion 20 or network type database control portion 30. In the former (relational type database 6), the relational type database control portion 20 retrieves the file (set of records) of the relational type database 6. From that, the user selects and emits a desired record. IF1 through IF6 each illustrate an interface.

In the foregoing database enquiry control system, when the records are retrieved by the network type database 14, unlike the relational type data base 6, the user must enquire once for each record.

Therefore, in such a system, in order to achieve the inquiries equivalent to a single enquiry statement of the relational type database by the control of the network type database enquiry, it is necessary to combine a plurality of enquiry statements, which causes the productive efficiency to be reduced as compared with the relational type database.

In view of such circumstances, the present invention was made and, its object is to provide an enquiry control system which is improved so that the enquiry control for the network-type database can be achieved as if it were carried out in the relational type database.

SUMMARY OF THE INVENTION

The present invention provides an enquiry control system comprising a terminal unit for generating a question to a database and displaying an answer for it, a relational type database and a network type database comprising:

a relational type database directory file for storing a directory of the relational type database;

a relational type database controlling portion for generating an enquiry object matching with the relational type database for the content to be processed by the relational type database to obtain an answer for that object;

a network type database controlling portion for generating an enquiry object matching with the network type database for the content to be processed by the network type database to obtain an answer for that object; and a network model data memory for storing the condition in which the records of the network type database are stored;

the network type database control portion comprising an object generating executing circuit which parses a retrieval request statement from the terminal to reference to the network model data, which is stored within the network model data memory, to determine a shortest route retrieving method.

Further, in order to carry out inquiries all at once after a plurality of enquiry objects is accumulated, it is preferable to provide a memory for temporarily retaining the enquiry objects generated at the network type database control portion. Further, in order to assist generation of the enquiry objects, it is preferable to provide a memory connected to the network type database control portion for previously storing the structure of the network type database.

Within the network model data model, network model data is stored for storing the condition in which the records of the network type database are stored. If, among the reference requests of the database enquiry statement, there is any reference request for a record stored within the network type database, then, referencing to this network model data, an enquiry object generating/executing circuit automatically operates an optimum method of retrieving the reference request record of the network model database for determination. Based on this determination, the enquiry object generating/executing circuit combines the objects inquiring of the plurality of databases to generate an enquiry object.

If the database enquiry is urgent, then this generated enquiry object is immediately entered to an enquiry object executing means of the enquiry object generating/executing circuit and, after referencing to the record of the network type database by the network type database control circuit, returns the answers to the terminal unit. If not, then an enquiry object is generated for all of the other entered database enquiry statements to temporarily store into the enquiry object memory to complete the compiling stage. Thereafter, at the program executing stage, the enquiry object is sequentially read out from the enquiry object generating/executing circuit to enter to the enquiry object executing means of the enquiry object generating/executing circuit to sequentially reference to the record of the network type database by the network type database control circuit so that its result is returned to the terminal unit.

Accordingly, in the system of the present invention, since a system for carrying out a similar control as in the enquiry statement for the relational type database can be built without adding any change or modification on the software system, which operates already built network type database or prepared network type database, it becomes possible to increase the productivity.

DESCRIPTION OF THE PREFERRED EMBODIMENTS

The present invention is hereinafter described in greater detail with reference to the accompanying drawings.

Figure 1:
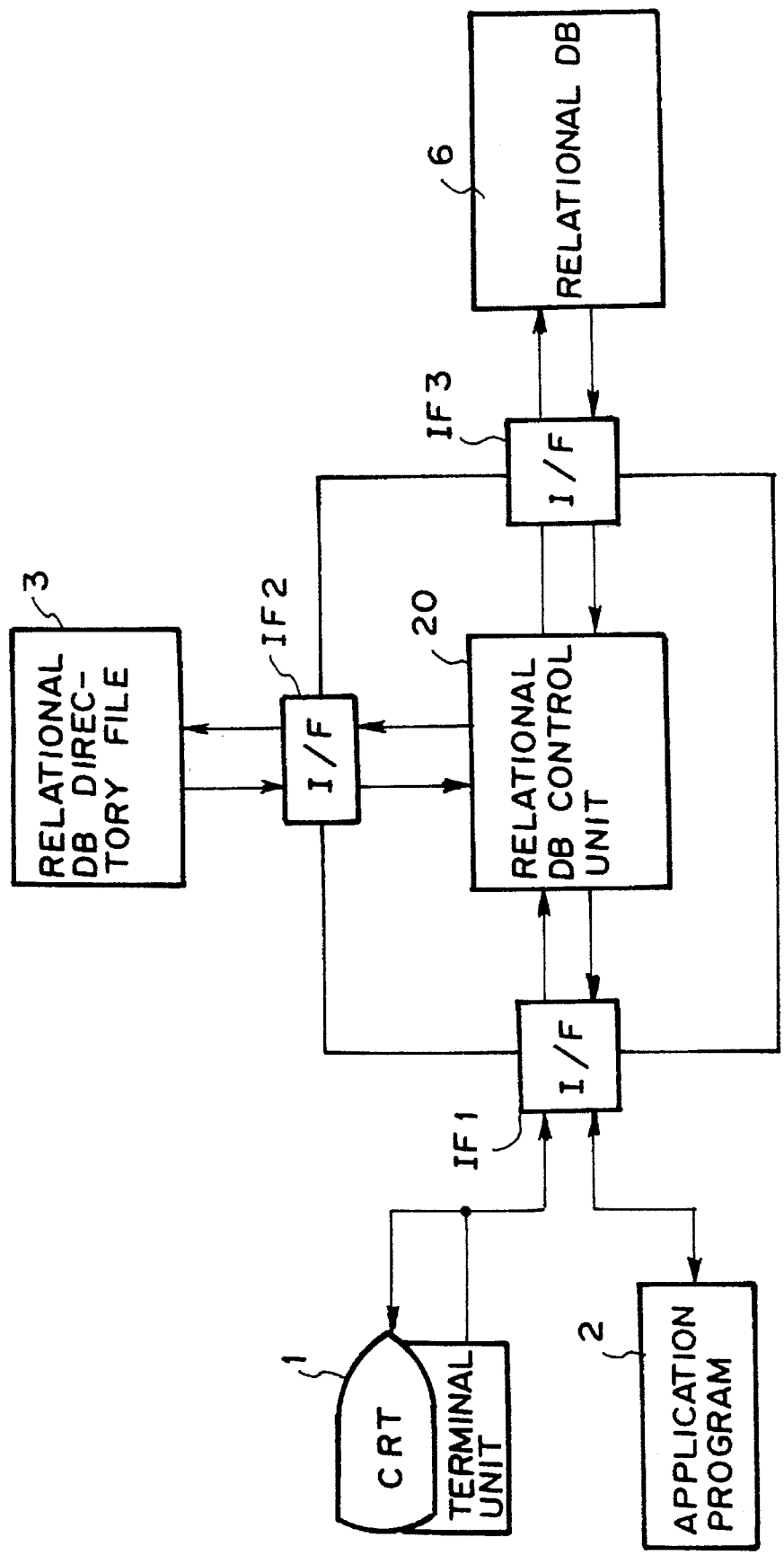
FIG. 1 is a block diagram of a conventional relational type database enquiry control system.
Figure 2:
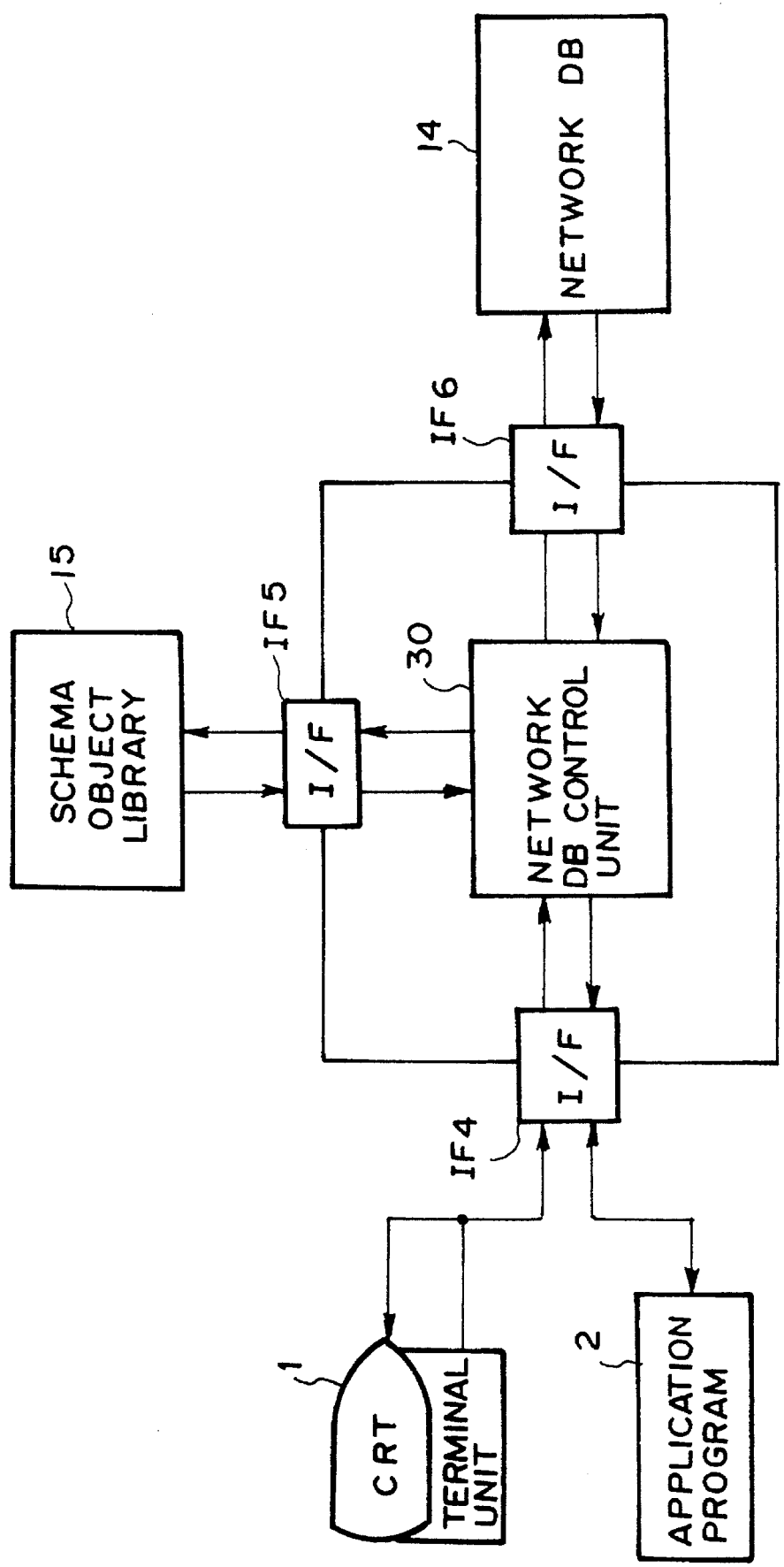
FIG. 2 is a block diagram of a conventional network type database enquiry control system.
Figure 3:
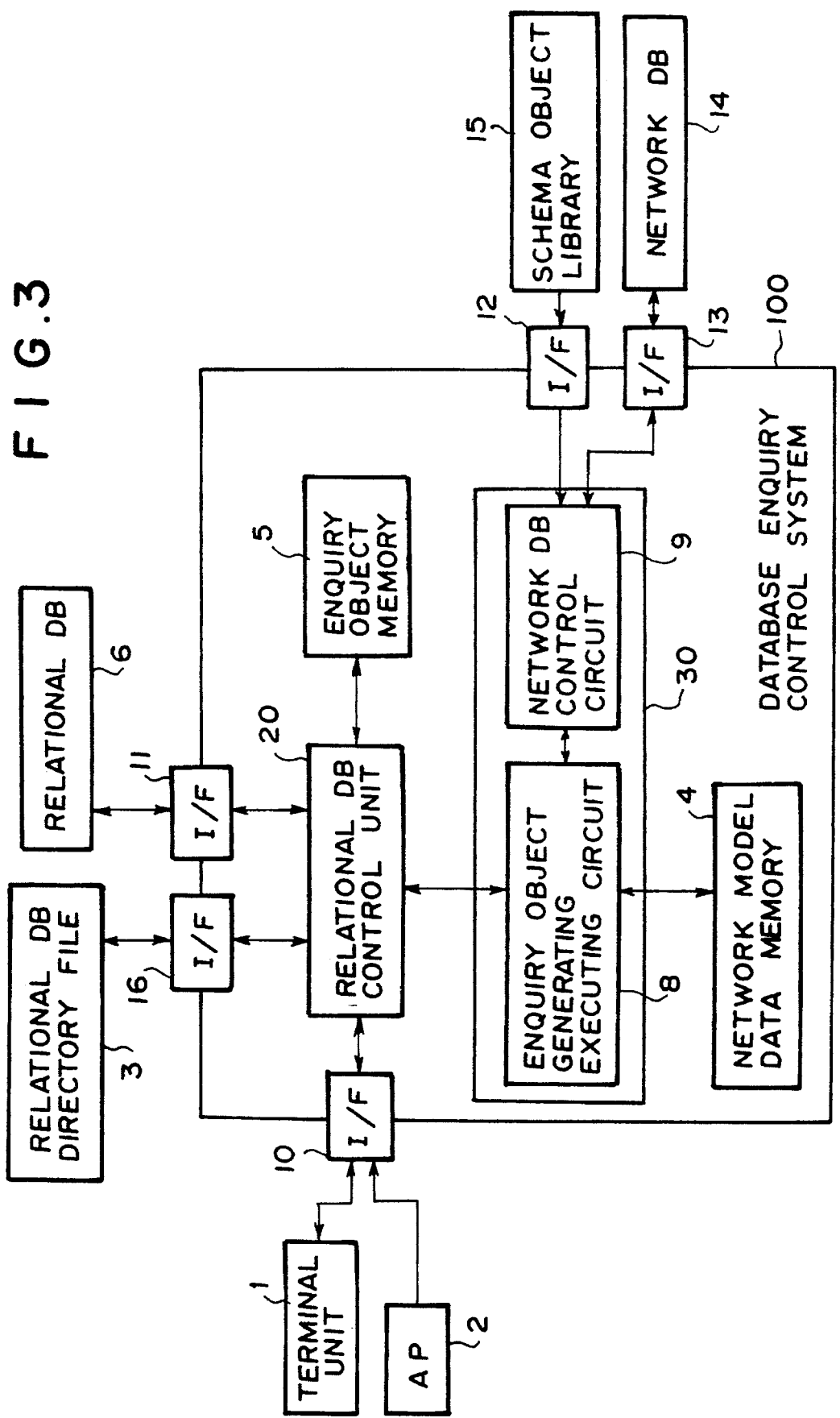
FIG. 3 is a block diagram of a database enquiry control system according to a specific embodiment of the present invention.

Connected to a database enquiry control system 100 of FIG. 3 via an interface 10 are a terminal unit 1 for generating an enquiry of the database and for displaying an answer therefrom and an application program 2. Further, to the database enquiry control system 100, a relational type database (hereinafter referred to as a "relational DB") 6 is connected via an interface 11, a relational DB directory file 3 is connected via an interface 16, a network type database (hereinafter referred to as a "network DB") 14 is connected via an interface 13 and a schema object library 15 is connected via an interface 12.

Asynchronously with the retrieval process, within the directory of the relational DB 6, table definition data of an original relational DB as well as table definition data are previously registered. To the table definition data for the network DB 14, an identifier intended for the network DB is assigned. Usually, the table definition data for the relational DB includes no table formation data, additional column data, set route data, set node data.

The database enquiry control system 100 comprises a relational DB control portion 20, an enquiry object memory 5, a network DB control portion 30 comprising an enquiry object generating/executing circuit 8 and a network DB control circuit 9 and a network model data memory 4.

The relational DB control portion 20 is connected to the enquiry object memory 5 as well as to the interfaces 10, 11 and 16.

The network DB control portion 30 is connected to the relational DB control portion 20, interfaces 12, 13 and the network model data memory 4.

Figure 4:
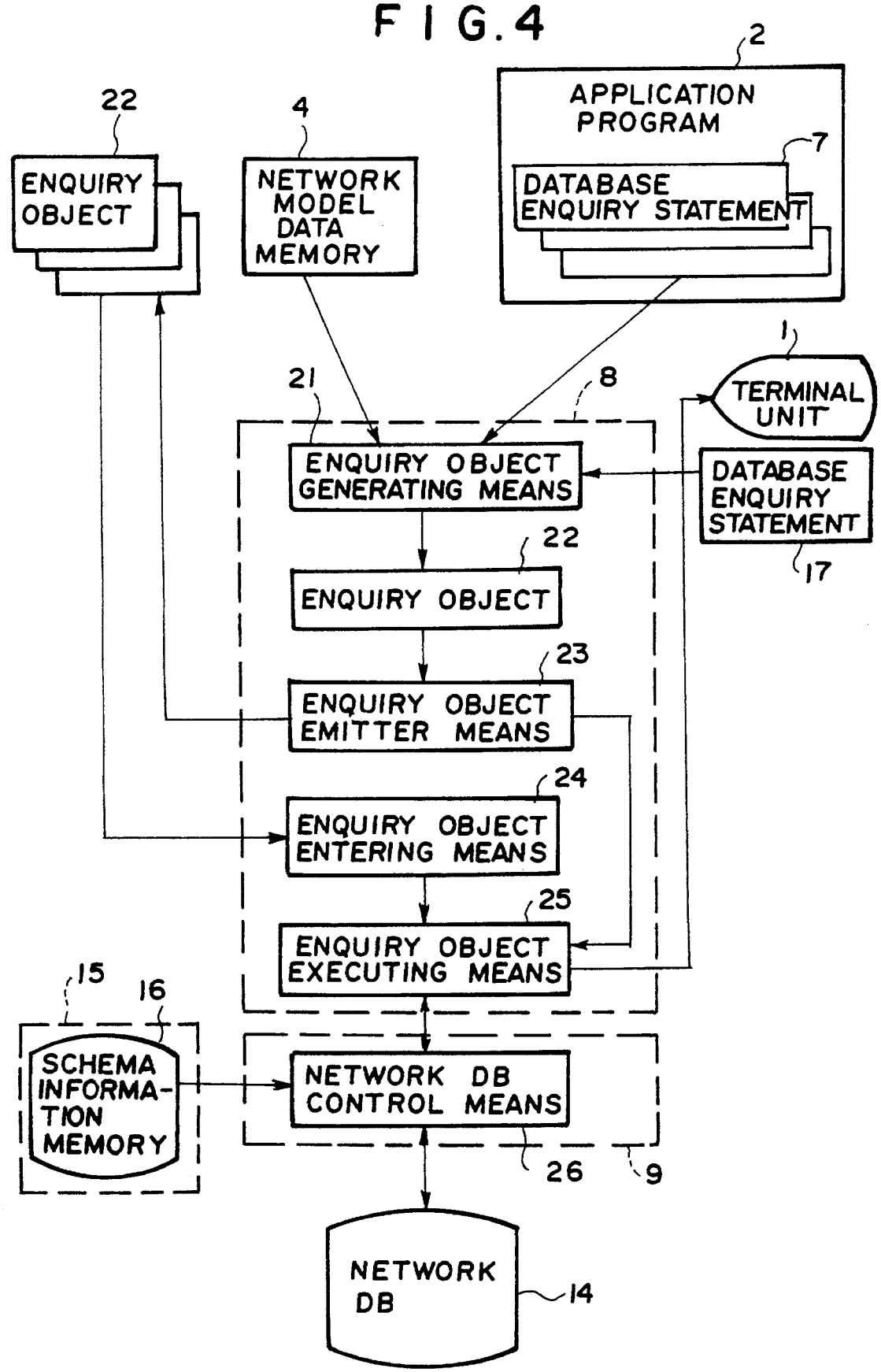
FIG. 4 is a block diagram for explaining the network type database enquiry operation of the system according to the present invention.

As illustrated in FIG. 4, the enquiry object generating/executing circuit 8 comprises an enquiry object generating means 21 for generating the enquiry object 22, an enquiry object emitter means 23, an enquiry object entering means 24 and an enquiry object executing means 25. Further, the network DB control circuit 9 comprises an enquiry object executing means 25 and a network DB control means 26 connected to the network DB 14, and this network DB control means 26 has a schema data memory 16 of the schema object library 15 connected. The application program 2 generates a database enquiry statement 7 to supply to the enquiry object generating means 21.

If the user requests to retrieve the database (record) from the terminal, then the directory of the relational DB 6 is referenced whether its content is relevant to the relational DB 6, or network DB 14.

As a result of this referencing, if the database retrieval request from the terminal is found to be directed to the record of the network DB 14, then the network DB control portion 30 is driven, and the enquiry object generating means 21 of the enquiry object generating/executing circuit 8 is driven. This enquiry object generating means 21 parses the database enquiry statement 17, which is the retrieval request, and by referencing to the ID or retrieval condition of the record to be retrieved and the internal schema stored within the network model data memory 4, which records previously separately and asynchronously the state in which the record within the network DB 14 is stored, determines a shortest route record retrieving method to generate a single retrieval code.

If a plurality of records is requested to retrieve in a retrieval request statement, then a similar processing is carried out on all the records to be retrieved to generate retrieval codes, which are bundled into an enquiry object.

After the processing by the enquiry object generating means 21 is completed, the enquiry object executing means 25 of the enquiry object generating/executing circuit 8 is driven. This enquiry object executing means 25 extracts a single retrieval code within the enquiry object to interpret its meaning. Further, the enquiry object executing means 25 drives the network DB control circuit 9 to pass the retrieval code.

The network DB control means 9, upon receipt of the retrieval code from the enquiry object generating/executing circuit 8, references to the schema read from the schema object library 15 to retrieve the network DB. The resulting retrieval result is returned to the terminal 1 through the network DB control circuit 9 and the enquiry object executing means 25.

Incidentally, if the requests for retrieval for the database is made according to a batch processing system, then an enquiry object is generated for the retrieval request for all the records which are requested within the batch job, and they are temporarily stored as an enquiry object memory on the memory 5 by the relational DB control portion 9 before they are read in as the enquiry object executing means is further driven.

This operation is described in detail with reference to FIGS. 5 through 8.

Figure 5:
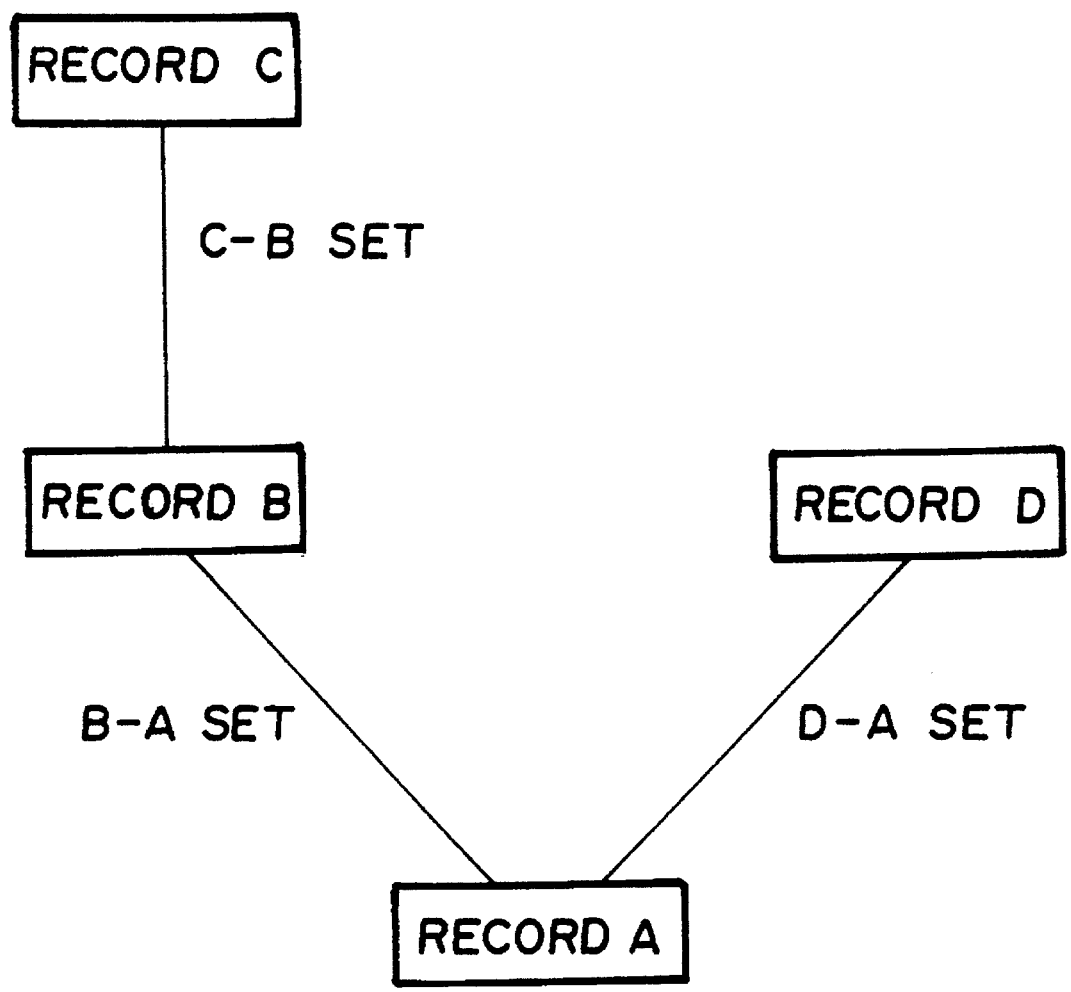
FIG. 5 is an explanatory view of a specific embodiment of external schema data which is stored within a schema object library shown in FIG. 3.

FIG. 5 illustrates a specific embodiment of the external schema data stored within the schema object library 15 of FIG. 3, in which the relationship between a record A and an upper class record B is defined by using a B-A set, the relationship between the record B and an upper class C is defined by using a C-B set and the relationship between the record A and an upper class record D is defined by using a D-A set.

Figure 6:
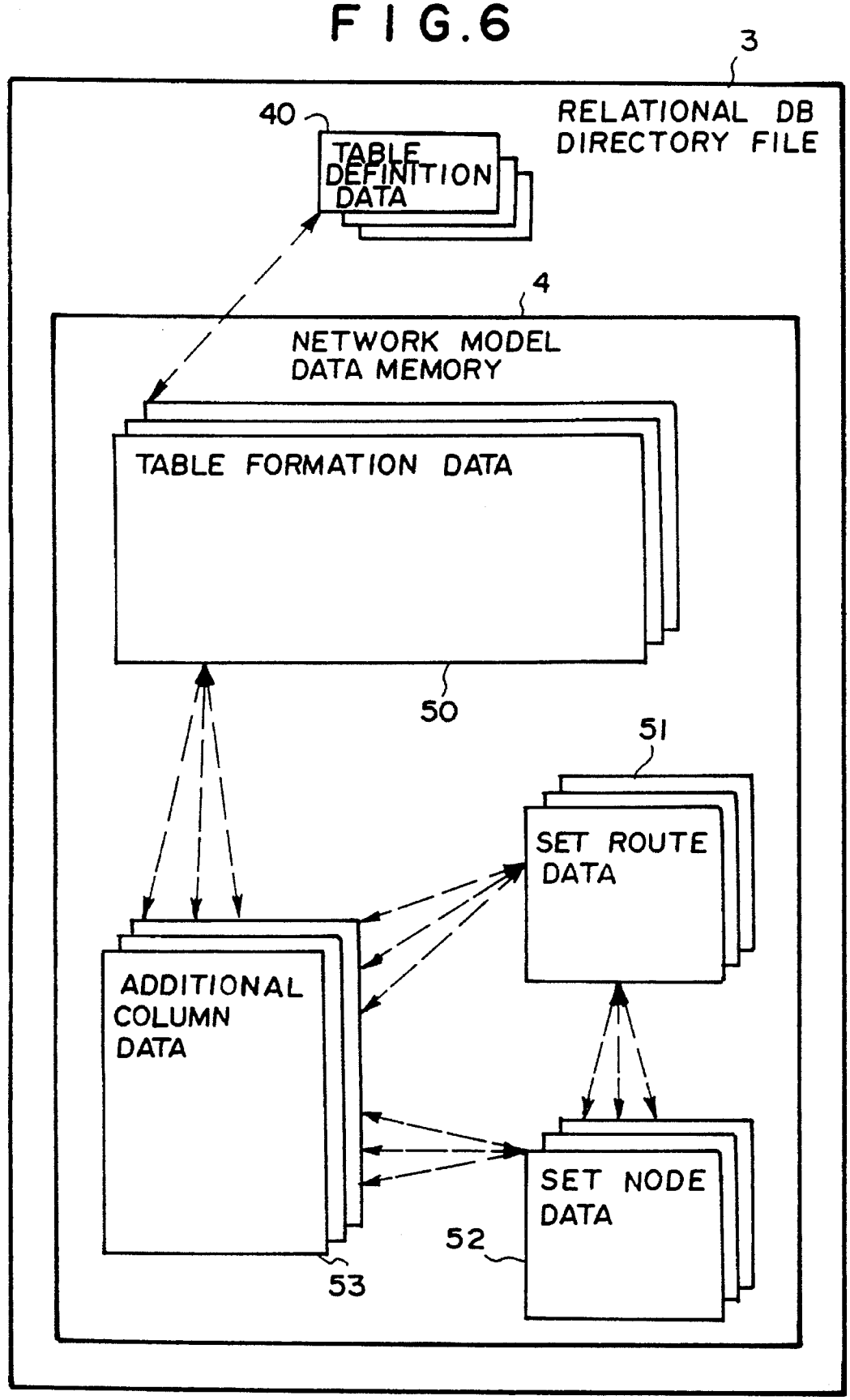
FIG. 6 is an explanatory view of a detailed arrangement of the relational type database directory file and the network model data memory shown in FIG. 3.

FIG. 6 illustrates a detailed arrangement of the relational DB directory file 3 and the network model data memory 4 of FIG. 3. In the FIG. 6, within the relational DB directory file 3, the table definition data 40 which defines the table of the relational DB (not shown) is stored in the form of column data.

Within the network model data memory 4, as the network model data, the table formation data 50, set route data 51, set node data 52 and additional column data 53 are stored. These data each correspond to the table definition data 40 in one-to-one relationship.

The table formation data 50 represents the column data on the record of the network DB 14, which constitutes the table defined according to the table definition data 40. Further, the set route data 51 represents an access route (hereinafter referred to as a "set route") between a basic record constituting that table and the upper class record (hereinafter referred to as an "additional record"). The set node data 52 represents data (hereinafter referred to as a "set data") regarding the set on that set route. Further, the additional column data 53 is the data making the additional record, set route data 51 and the set node data 52 correspond to each other.

For example, if the table defined by the table definition data 40 takes the record A of FIG. 5 as the basic record and the record D as the additional record, then the table formation data 50 includes the column data of the record A and the column data of the record D. For the set route data 51, it is known that, as the set route of the record A, a set route comprising the (C-B) set and the (B-A) set and a set route comprising the (D-A) set are present. However, neither of the (C-B)set, (B-A) set and (D-A) set are presented within the set route data 51, but they are presented to the set node data 52. To the additional column data 53, a data which makes the column data of the record D, set route data. 51 and the set node data 52 correspond to each other is shown.

Figure 7:
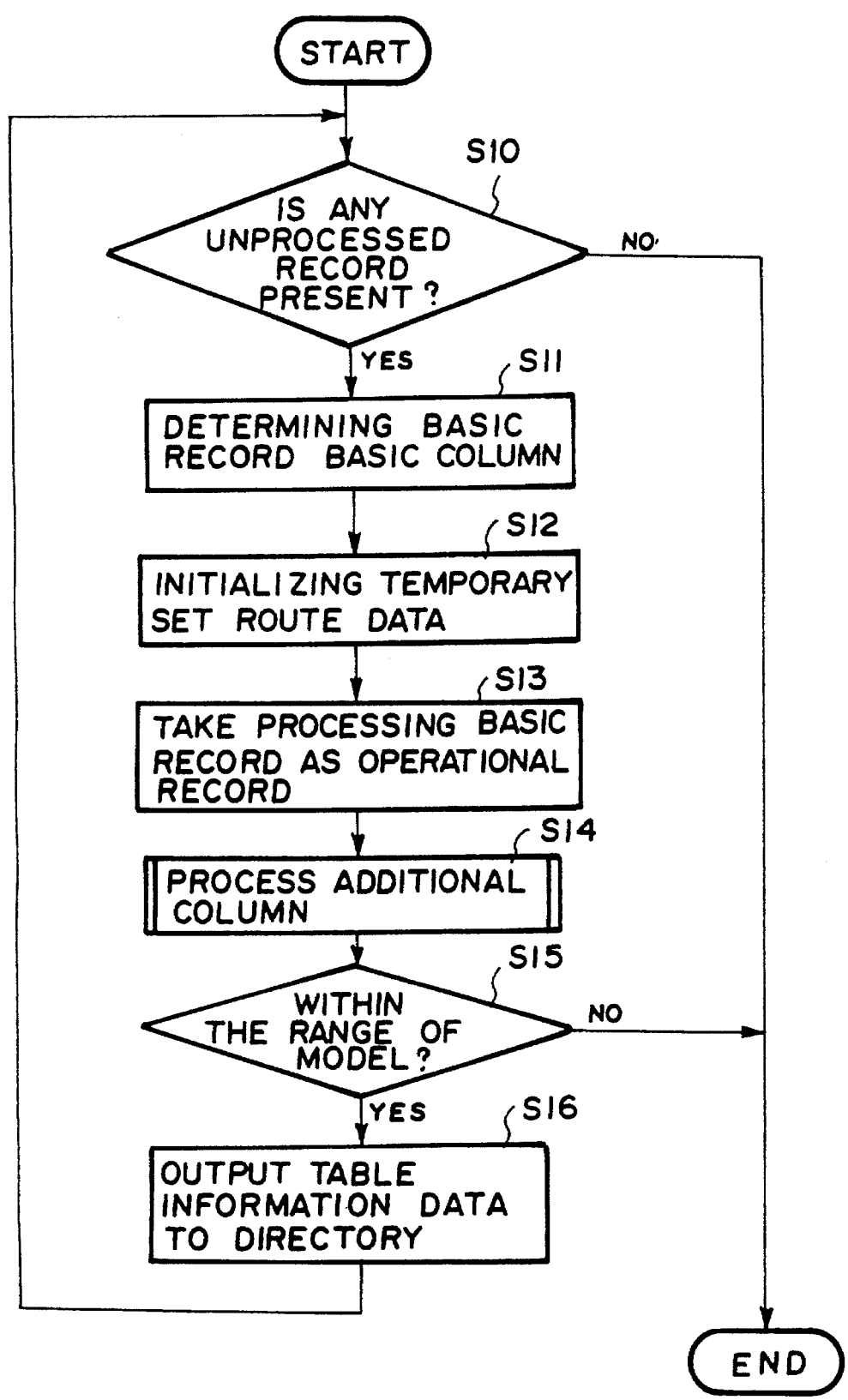
FIG. 7 is a flowchart of the operation of the enquiry object executing means shown in FIG. 3.

Next, the operation of the present invention is described with reference to a flowchart of FIG. 7.

If the enquiry control of the relational DB is carried out on the network DB 14 according to the database enquiry statement, then, first, the prepared external schema data and the internal schema data are each entered to the enquiry object generating/executing circuit 8 to generate a network model data, which is stored into the network model data memory 4 of the relational DB directory file 3.

If the foregoing network model data is generated, then it is not necessary to generate the network model data any further within the enquiry object generating/executing circuit 8 for the external and internal schema data entered to the enquiry object generating/executing circuit 8.

The enquiry object generating/executing circuit 8 receives the prepared external and internal schema data, and emits the network model data corresponding to the table definition data 40 and the network model data corresponding to the former, as shown in FIG. 6, to the relational DB directory file 3.

That is, the enquiry object generating/executing circuit 8 examines whether, as the basic record, any unprocessed record is present or not (step S10). If "yes", then the enquiry object generating/executing circuit 8 determines the basic record corresponding to the table of the relational DB while generating the basic column (step S11). On the other hand, if "no", then the enquiry object generating/executing circuit 8 completes the generating process of the network model data.

Here, if the record A of FIG. 5 is selected, then the basic record is the record A, and the basic column is the field included within the record A which is defined by the content of the schema object library 15.

Then, the enquiry object generating/executing circuit 8 initializes the temporary set route data (step S12), and processes the additional column with the basic record (record A) as the operational record (steps S13, 14). Since a data is returned from this additional column processing indicating whether the content of the schema object library 15 fell within a range allowing the model to be automatically changed, based on that data, the enquiry object generating/ executing circuit 8 examines whether it is true or not (step S15).

If "yes", then the enquiry object generating/executing circuit 8 generates the table definition data to store into the relational DB directory file 3. It generates a table definition data corresponding to this table definition data in one-to-one relationship to store into the network model data memory 4 (step S16). If not, then, the enquiry object generating/ executing circuit 8 completes the generating process of the network model data.

The foregoing processing is repeatedly carried out for all the records defined by the content of. the schema object library 15.

Figure 8:
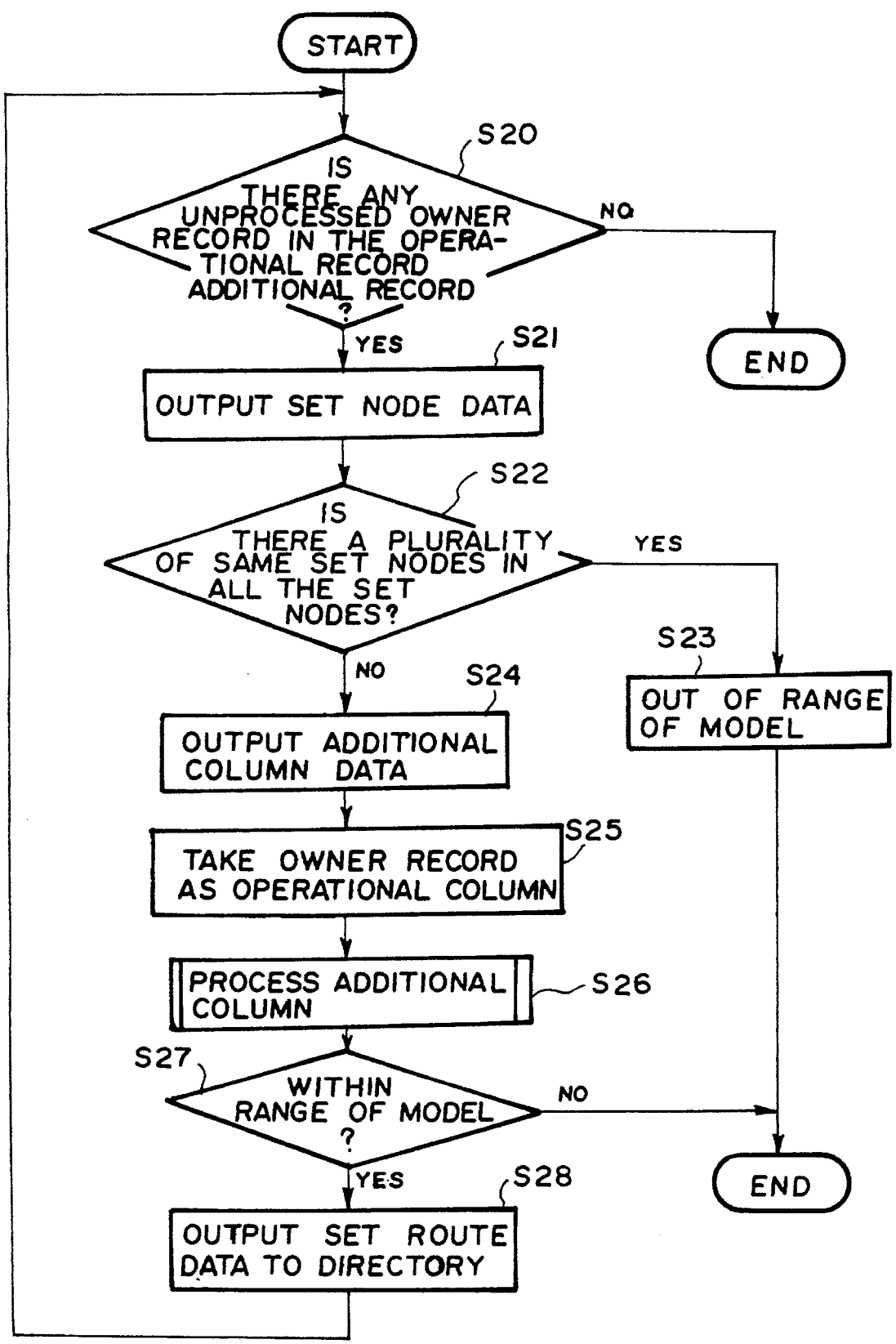
FIG. 8 is a flowchart of an additional column processing in the system shown in FIG. 3.

The foregoing additional column processing is described with reference to FIG. 8.

First, among the upper owner records of the operational record stored within the schema object library 15, it is examined whether any unprocessed record is present or not as the additional record (step S20). If "yes", then the set data within the external schema data defining the relationship between that record and the operational record is emitted to the network model data memory 4 as the set node data 52 (step S21). If not, then the additional column processing is completed.

Here, since the record A is the operational record and neither of the records B, D, which are the upper owner records than the record A, are processed, the record B is first selected as the additional record. The (B-A) set data, which defines the relationship between this record B and the record A, is emitted to the network model data memory 4 as the set node data 52.

Next, it is examined whether the set data emitted as the set node data 52 is present or not on the set route with the so far generated record A as the basic record (step S22). If the set data is present on the set route, then since a plurality of set routes exits for a single additional column, it falls out of the target to be changed for its model, followed by the out-of model processing (step S23) and, then, it escapes from the additional column processing. In this out-of model processing, it is informed that the network model data cannot be generated by the enquiry object generating/executing circuit 8 while it is instructed that the schema data corresponding to the plurality of set routes be subdivided.

If no set data is present on the set route, then the column data on the record selected as the additional record is emitted to the network model data memory 4 as the additional column data 53 (step S24). Here, the column data on the record B is emitted to the network model data memory 4 as the additional column data 53.

If the additional column data 53 is emitted to the network model data memory 4, then the additional column processing is recursively executed with the record selected as the additional record as the operational record (steps S25, 26). In this additional column processing, if, as a result of the step S20, it is found that no further upper owner record is present, the procedure is returned to the additional column processing with the basic record as the operational record.

Here, the additional column processing is carried out with the record B as the operational record, and the record C is selected as the additional record. In this additional column processing, the (C-B) set data which defines the relationship between the records C and B is emitted to the network model data memory 4 as the set node data 52, and the column data of the record C as the additional column data 53. Thereafter, although an additional column processing is carried out with the record C as the operational record, since no further upper owner record is present for the record C, the procedure is returned to the additional column processing which uses the record A, the basic record, as the operational record.

If the procedure is returned from the additional column processing with the additional record as the operational record, then it is examined whether the result of these additional column processing fall within the range of the automatic model transform or not (step S27) and, if not, the additional column processing is exited. On the other hand, if "yes", then the set route data 51 established by the foregoing process is emitted to the network model data memory 4 (step S28). Here, a set route comprising the (C-B) set and the (B-A) set is emitted to the network model data memory 4 as the set route data.

The foregoing process is repeatedly executed for all the owner records of the operational record. That is, the additional column processing is executed on the owner records B, D of the record A, and the set route data 51 (two set routes) informing that the set route comprising the (C-B) set and the (B-A) set and the set route comprising the (D-A) set are present is stored into the network model data memory 4, the data regarding (C-B) set, (B-A) and (D-A) and the column data regarding the records B, C and D are each stored into the same as the set node data 52 and as the additional column data 53 respectively.

The enquiry object generating/executing circuit 8 ends its operation after the foregoing process is executed for all the records included within the schema data of the schema object library 15, so that a single network model data is completed to be stored into the network model data memory 4.

In the database enquiry control system according to the present invention, if the database retrieval request from the terminal 1 is determined to be directed to the record of the network DB, then the network DB control portion is driven, within which the enquiry object generating means 21 of the enquiry object generating/executing circuit 8 is driven. The enquiry object generating means 21 parses the retrieval request statement, and references to the ID or retrieval condition of the record to be retrieved and the network model data memory (internal schema), which records previously asynchronously records the condition in which the record is stored within the network DB to determine a method in which the record may be retrieved through the shortest route to generate a single retrieval code.

Figure 9:
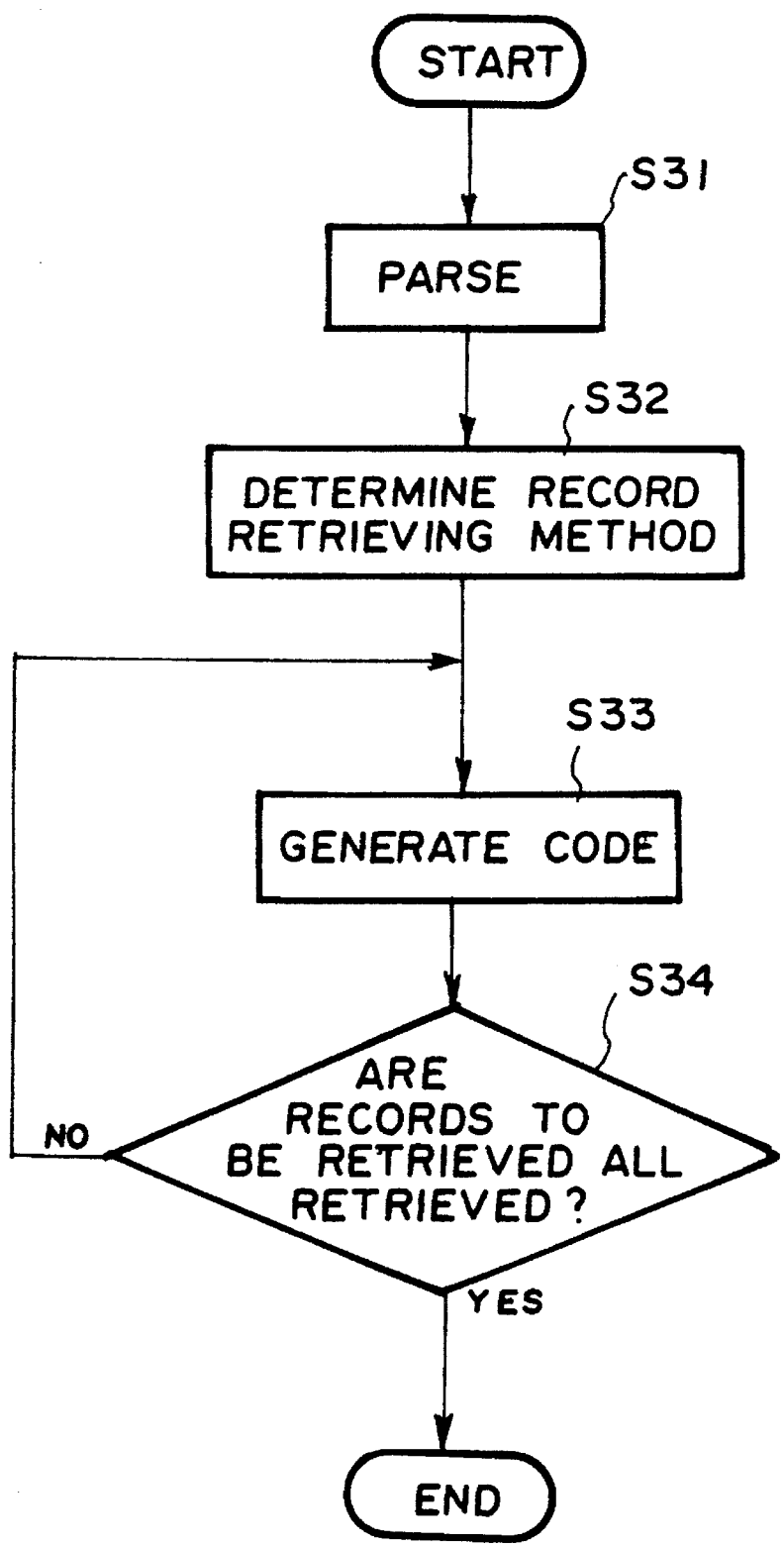
FIG. 9 is a flowchart illustrating the flow of the operations of the enquiry object generating means in the system shown in FIG. 3.

That is, in FIG. 9, if the content of the database enquiry statement 17 includes the reference to the record of the network DB 14, then the referencing sequence of the network DB 14 is started for execution. As illustrated in FIG. 6, the enquiry object generating means 21 of the enquiry object generating/executing circuit 8 parses the enquiry statement for the relational DB (step S31), references to the network model data memory 4 previously storing the condition in which the record within the network DB 14 is stored to determine the method of retrieving the record included within the network DB 14 (step S32). Next, a code is generated according to the foregoing operation (step S33), and this operation is repeated until all the records to be retrieved are retrieved (step S34).

The method of determining the record retrieving method is hereinafter explained with specific reference to the network DB structure of FIG. 10. A retrieval condition specified by the enquiry statement 17 for the relational DB is examined to determine a record to be first retrieved (hereinafter referred to as an entry record) from a group of records of FIG. 5. In determining the entry record, a data whether the retrieval condition includes the field specified within the record or the specified field serves as the index key or not is obtained from the network model data so that the retrieving record can be specified according to the fewest instructions. Here, let us assume that the field of the record A be specified as the retrieval condition and that the field takes the form of a half field of the index defined in the record A and the record A is the entry record.

Next, If a choice is made as to whether the record B should be retrieved by utilizing the (B-A) set, or the record D should be retrieved by utilizing the (D-A) set, then the records B and D are compared with each other according to the network model data to select the shortest means by which to retrieve the record according to the physical data such as the data ratio between sets or area data including records. Here, since the record A is defined to lie in the neighborhood of the (B-A) set, the record B will be retrieved.

Further, let us assume that, by utilizing the (C-B), the record C be retrieved and that finally, by utilizing the (D-A) set, then the record D be retrieved. If the record retrieval method is determined, the enquiry object generating means 21 of the enquiry object generating/executing circuit 8 generates an enquiry code for the network DB 14 according to the record retrieval method. This operation is repeated for all the records necessary for the enquiry statement 17 for the relational DB to generate all the retrieval codes to achieve an enquiry object 22.

If the database enquiry statement 17 entered from the terminal unit 1 is a dynamic execution request which calls for the urgent reference, then the enquiry object executing means 25 which lies within the enquiry object generating/executing circuit 8 immediately starts to execute the enquiry object but, if not, and if it is the database enquiry statement 17 entered from the application program 2, then the enquiry object 22 is generated for the enquiry statement 17 for all the networks DB 14, which is stored into the enquiry object memory 5 by the enquiry object emitter means 23 for completion of the compiling stage. At the program executing stage, the enquiry object 22 is read from the enquiry object memory 5 by the enquiry object entering means 24 to pass the control to the enquiry object executing means 25.

Figure 10:
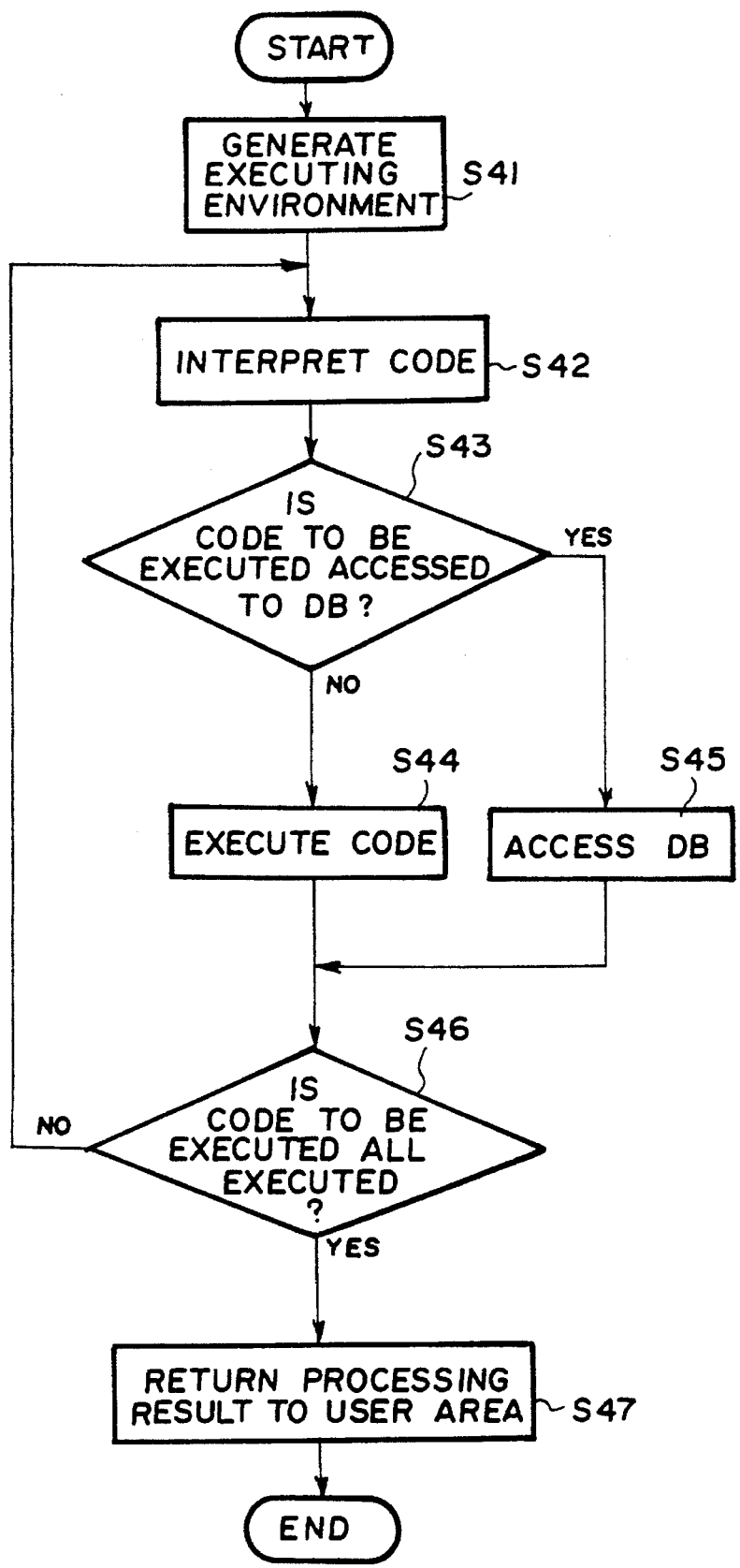
FIG. 10 is a flowchart illustrating the flow of the operations of the enquiry object executing means in the system shown in FIG. 3.

The enquiry object executing means 25, as shown in FIG. 10, generates an executing environment necessary to access the network DB 14 (step S41), and interprets the codes, which comprises an executing portion included within the enquiry object 22 (step S42). If that code is intended for accessing the database, then the control is passed to the network DB control means 26 of the network DB control circuit 9, which references to the schema data stored within the schema object library 15 to execute the processing on a record within the network DB 14 (steps S43 to S45) and, if not, then the executing environment is updated, or it is determined whether the result of the database access coincides with the conditions or not (steps S43 to S44).

The codes are executed until the processing is completed on all of them (step S46) and, upon its completion, the executed result is returned to the application program 3 or terminal unit 1 (step S47). The foregoing is the description of the processing of the enquiry object executing means 25.

Figure 11:
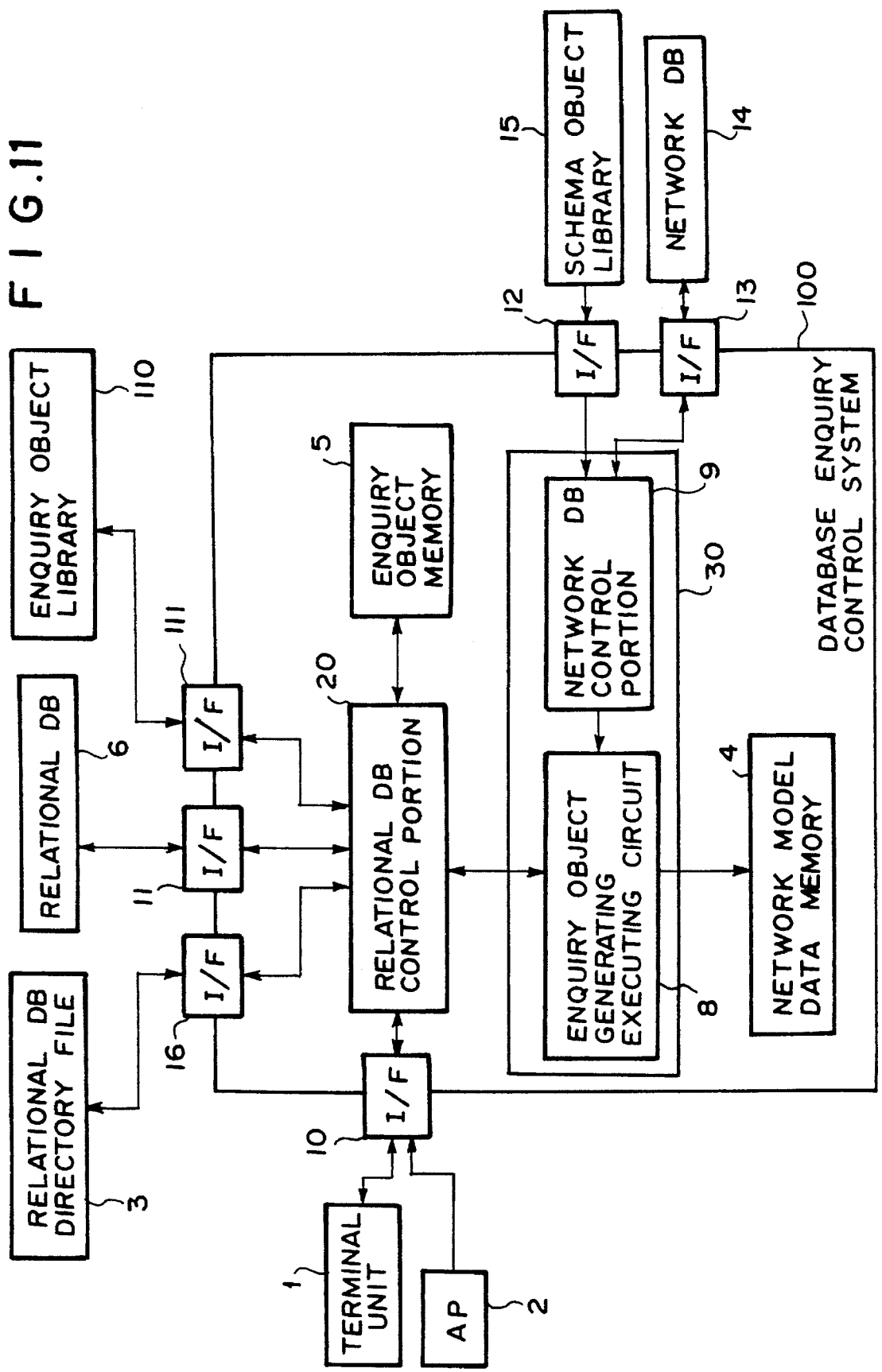
FIG. 11 is a block diagram of the arrangement of the database enquiry control system according to a second embodiment of the present invention.

FIG. 11 illustrates a database enquiry control system according to another embodiment of the present invention, in which the same or similar portions as those of FIG. 3 are designated with the same reference number to omit their detailed description.

In this embodiment, a secondary storage portion, i.e., an enquiry object library 110 for storing the enquiry object asynchronously with the retrieval process is connected to the enquiry control portion via an interface 111. According to this arrangement, the object generating means may be eliminated, if necessary, to achieve a further improvement of the processing efficiency.

Figure 12:
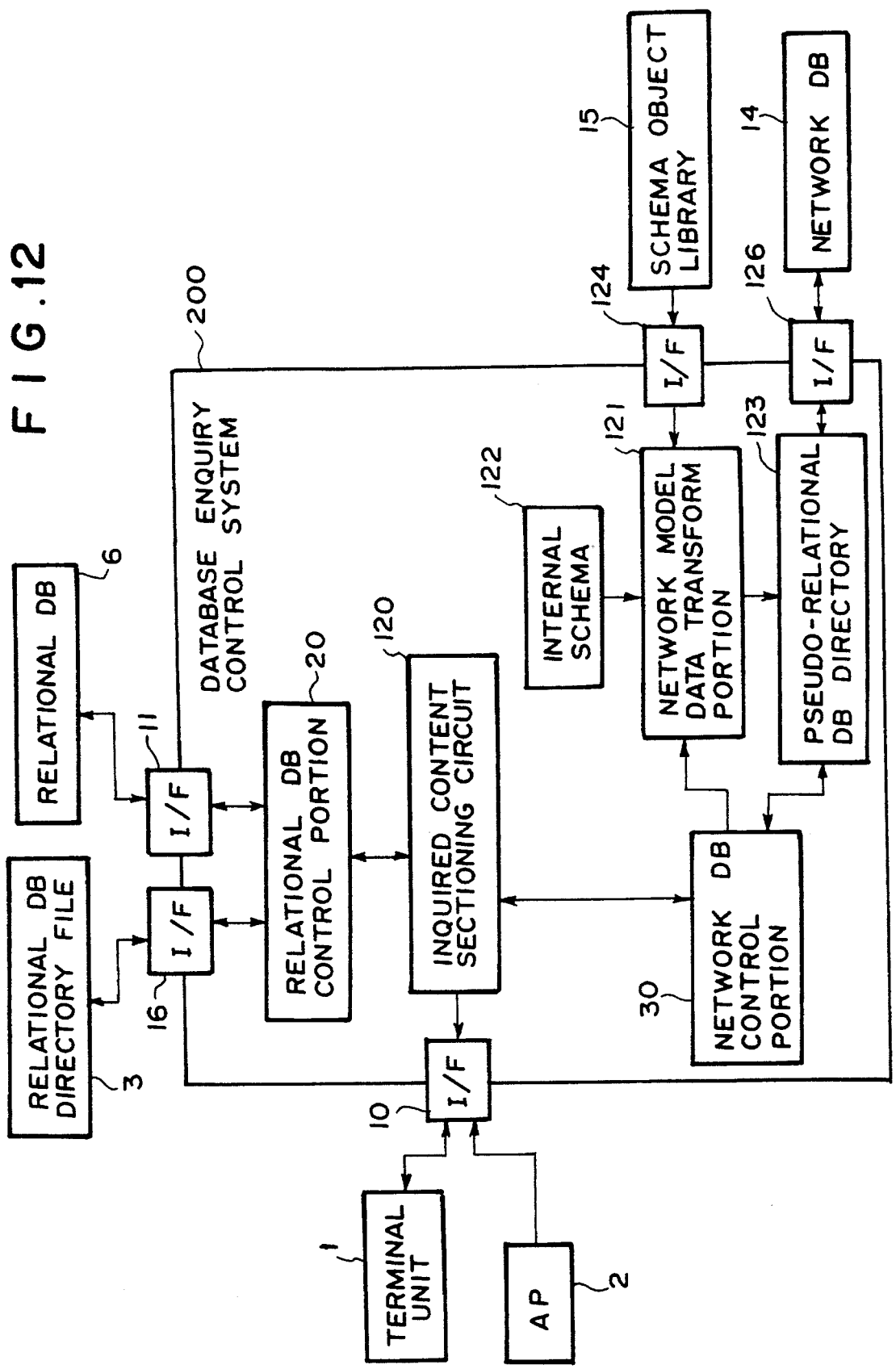
FIG. 12 is a block diagram of the arrangement of the database enquiry control system according to a third embodiment of the present invention.

FIG. 12 illustrates a database enquiry control portion according to a still further embodiment of the present invention, in which a database enquiry control portion 200 is provided with an inquired content section circuit 120, a network model data transform portion 121 for transforming the network model data based on an internal schema 122 and a pseudo-relational DB directory 123. The network model data transform portion 121 is connected to a network DB control portion 30 and, via an interface 124, to an external schema library 15 respectively. Further, the pseudo-relational DB directory file 123 previously includes a table definition data therein in the same manner as in the relational DB, and is connected to the network DB control potion 30 and, further, via an interface 126 to the network DB 14 respectively.

If the retrieval is requested to the database (record) from the terminal 1 by the user, the inquired content sectioning circuit 120 determines whether its inquired content is directed to the relational DB or to the network DB. If the former is the case, then the relational DB control portion 20 is driven. On the other hand, if the latter is the case, then the network DB control portion 30 is driven, which in turn drives the network model data transform portion 121.

The network model data transform portion 121, with the external schema of the network DB 14 (which defines the relationship between the records by the set) and the internal schema 122 (which defines the on-the-memory storage condition) as inputs, generates the network model data (comprising the table arrangement data, additional column data, set route data and set node data) to store into the pseudo-relational DB directory 123 associating with the table definition data of the relational DB.

The network DB control portion 30, when the network model data has been generated by the network model data transform portion 121, retrieves the network DB 14 according to that content to return its result.

Also in this case, there is no need to alter the existing relational DB directory file.

Figure 13:
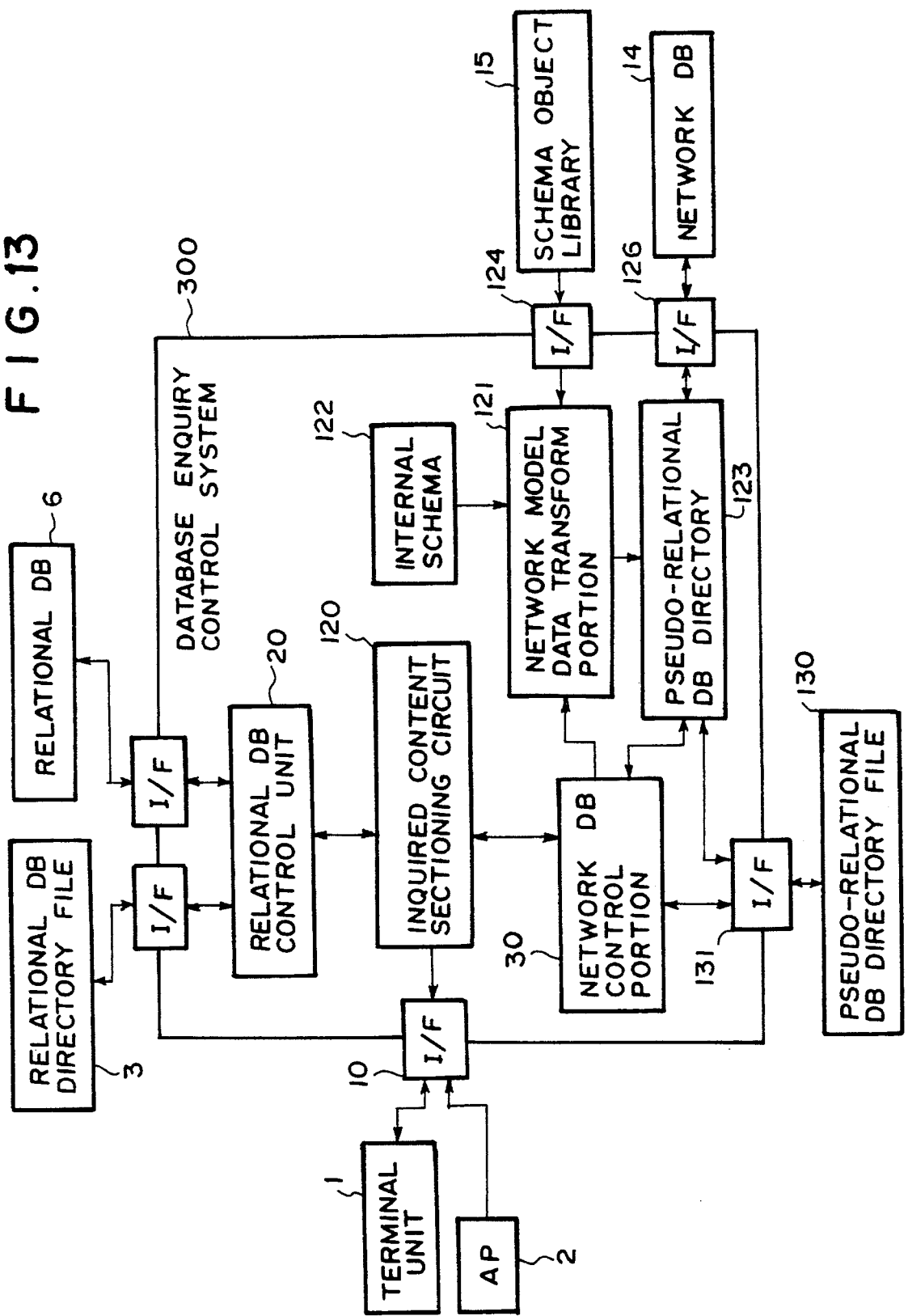
FIG. 13 is a block diagram of the arrangement of the database enquiry system according to a fourth embodiment of the present invention.

FIG. 13 illustrates a database enquiry control circuit 300 according to a still further embodiment of the present invention, which is the same as that of FIG. 12 except that it is provided with a pseudo-relational DB directory file 130 connected via an interface 131.

The pseudo-relational DB directory file 130 is provided to store the foregoing pseudo-relational DB directory 123 asynchronously with the retrieval operation, so that if necessary, the network control portion 30, which drives the network data transform portion 121, may be eliminated to achieve a further improvement of the processing efficiency.

What is claimed is:

1. An enquiry control system coupled to a terminal unit which inquires of a database via an enquiry and displays an answer to the enquiry, a relational type database and a network type database, the enquiry control system comprising:

a relational type database directory file for storing a directory of said relational type database, said directory including table definition data of an original relational database;

a relational type database control portion for generating a first enquiry object matching with said relational type database, the content of the first enquiry object to be processed by said relational type database to obtain an answer for said first enquiry object;

a network type database control portion for generating a second enquiry object matching with said network type database, the content of the second enquiry object to be processed by said network type database to obtain an answer for said second enquiry object; and a network model data memory for storing a condition in which a record of the network type database is stored, said network type database control portion providing an object generating/executing circuit for parsing a retrieval request statement from said terminal unit to reference data stored within said network model data memory to determine a shortest route retrieving method.

2. A system according to claim 1, further comprising an enquiry object memory for temporarily retaining the second enquiry object generated by said network type database control portion.

3. A system according to claim 1, further comprising an enquiry object library for storing said first enquiry object asynchronously with the shortest route retrieval method.

4. An enquiry control system for use with a terminal unit, a relational type database and a network type database, comprising:

a relational type database directory storing a directory of said relational type database, said directory including table definition data of an original relational database;

an enquiry content sectioning circuit receiving an enquiry from said terminal unit and determining the content to be processed by said relational type database and the content to be processed by said network type database;

a relational type database control portion for generating an enquiry object matching with said relational type database for said content determined to be processed by said relational type database to obtain an answer for said object;

a network type database control portion for generating an enquiry object matching with said network type database for said content determined to be processed by said network type database to obtain an answer for said object;

a network model data transform portion connected to said network type database control portion;

a pseudo-relational type database directory connected between said network type database control portion and said network type database; and a schema object library connected to said network model data transform portion.

5. A system according to claim 4, further comprising a pseudo-relational type directory file connected to said network type database control portion and said pseudo-relational type database directory.

6. An enquiry control system coupled to a terminal unit which inquires of a database via an enquiry and displays an answer to the enquiry, a relational type database and a CODASYL type database, the enquiry control system comprising:

a relational type database directory file for storing a directory of said relational type database, said directory including table definition data of an original relational database;

a relational type database control portion for generating a first enquiry object matching with said relational type database, the content of the first enquiry object to be processed by said relational type database to obtain an answer for said first enquiry object;

a CODASYL type database control portion comprising an enquiry object generating and executing circuit for generating a second enquiry object matching with said CODASYL type database, the content of the second enquiry object to be processed by said CODASYL type database to obtain an answer for said second enquiry object; and a network model data memory for storing a condition in which a record of the CODASYL type database is stored, said CODASYL type database control portion providing an object generating/executing circuit for parsing a retrieval request statement from said terminal unit to reference data stored within said network model data memory to determine a shortest route retrieving method.

7. A system according to claim 6, further comprising an enquiry object memory for temporarily retaining the second enquiry object generated by said CODASYL type database control portion.

8. An enquiry control system coupled to a terminal unit which inquires of a database via an enquiry and displays an answer to the enquiry, a relational type database and a CODASYL type database, the enquiry control system comprising:

a relational type database directory file for storing a directory of said relational type database, said directory including table definition data of an original relational database;

a relational type database control portion for generating a first enquiry object matching with said relational type database, the content of the first enquiry object to be processed by said relational type database to obtain an answer for said first enquiry object;

a CODASYL type database control portion comprising an enquiry object generating and executing circuit for generating a second enquiry object matching with said CODASYL type database, the content of the second enquiry object to be processed by said CODASYL type database to obtain an answer for said second enquiry object;

a network model data memory for storing a condition in which a record of the CODASYL type database is stored, said CODASYL type database control portion providing an object generating/executing circuit for parsing a retrieval request statement from said terminal unit to reference data stored within said network model data memory to determine a shortest route retrieving method; and an enquiry object library for storing said first enquiry object asynchronously with the retrieval process.

9. An enquiry control system for use with a terminal unit, a relational type database and a CODASYL type database, comprising:

a relational type database directory storing a directory of said relational type database, said directory including table definition data of an original relational database;

an enquiry content sectioning circuit receiving an enquiry from said terminal unit and determining the content to be processed by said relational type database and the content to be processed by said CODASYL type database;

a relational type database control portion for generating an enquiry object matching with said relational type database for said content determined to be processed by said relational type database to obtain an answer for said object;

a CODASYL type database control portion for generating an enquiry object matching with said CODASYL type database for said content determined to be processed by said CODASYL type database to obtain an answer for said object;

a network model data transform portion connected to said CODASYL type database control portion;

a pseudo-relational type database directory connected between said CODASYL type database control portion and said CODASYL type database; and a schema object library connected to said network model data transform portion.

10. A system according to claim 9, further comprising a pseudo-relational type directory file connected to said CODASYL type database control portion and said pseudo-relational type database directory.

* * * * *